(12) United States Patent
King, III et al.

(10) Patent No.: US 9,436,748 B2
(45) Date of Patent: Sep. 6, 2016

(54) METHOD AND APPARATUS FOR DISTRIBUTED CONFIGURATION MANAGEMENT

(75) Inventors: James E. King, III, Westford, MA (US); Michael T. Stack, North Chelmsford, MA (US); Arthur J. Beaverson, Boxborough, MA (US); Steven Bagby, Lexington, MA (US)

(73) Assignee: SimpliVity Corporation, Westboro, MA (US)

( * ) Notice: Subject to any disclaimer, the term of this patent is extended or adjusted under 35 U.S.C. 154(b) by 80 days.

(21) Appl. No.: 13/167,365

(22) Filed: Jun. 23, 2011

(65) Prior Publication Data

US 2012/0331029 A1    Dec. 27, 2012

(51) Int. Cl.
*G06F 15/16*    (2006.01)
*G06F 17/30*    (2006.01)

(52) U.S. Cl.
CPC ... *G06F 17/30575* (2013.01); *G06F 17/30206* (2013.01); *G06F 17/30356* (2013.01)

(58) Field of Classification Search
USPC .......................... 709/243, 201; 707/631, 629
See application file for complete search history.

(56) References Cited

U.S. PATENT DOCUMENTS

| 6,748,429 | B1 | 6/2004 | Talluri et al. | |
| 7,493,363 | B2 * | 2/2009 | Huitema et al. | 709/204 |
| 7,546,486 | B2 * | 6/2009 | Slik et al. | 714/15 |
| 8,073,922 | B2 * | 12/2011 | Bates | 709/208 |
| 2010/0106744 | A1 * | 4/2010 | Wang | G06F 17/30206 707/783 |
| 2011/0225121 | A1 * | 9/2011 | Cooper et al. | 707/634 |
| 2011/0276633 | A1 * | 11/2011 | Marchisio et al. | 709/205 |

FOREIGN PATENT DOCUMENTS

| EP | 1246064 A2 | 10/2002 |
| JP | 2002-297432 A | 10/2002 |
| JP | 2006-195890 A | 7/2006 |

OTHER PUBLICATIONS

International Search Report and Written Opinion mailed Aug. 8, 2012 in corresponding PCT/US2012/042244.
Jiang Lan et al., "Consistency Maintenance in Peer-to-Peer File Sharing Networks", Aug. 24, 2007, pp. 1-11, retrieved from Internet URL:http://web-archive.org/web/20070824064724/http://lass.cs.umass.edu/papers/ps/p2pconsistency.ps [retrieved on Jul. 26, 2012], abstract sections I, II and III; p. 1-p. 4.

(Continued)

*Primary Examiner* — Richard G Keehn
(74) *Attorney, Agent, or Firm* — Polsinelli PC (57) ABSTRACT

Method and apparatus for replicating data structures over a network in which each data structure is assigned an owner node among a plurality of networked peer nodes. Preferably that owner can be ascertained through information in the data structure. When an update to the data structure is desired by a non-owner, a request to modify the data structure is sent out on the network and when received by the owner, the owner performs the modification. The owner node can then notify the other nodes regarding the update. The method, implemented through a single-writer, multiple-reader paradigm, insures availability, partition tolerance and eventual consistency; it avoids the high overhead costs and single point of failure drawbacks of the prior art centralized management and locking protocols. Administrators can connect to any peer node in the network to manage, monitor and request modifications to a data structure.

20 Claims, 6 Drawing Sheets

(56) References Cited

OTHER PUBLICATIONS

Saurabh Tewari et al., "Analysis of Search and Replication in Unstructured Peer-to-Peer Networks" Sigmetrics '05, Jun. 10, 2005, pp. 1-2, retrieved from the Internet: URL:http://www.lk.cs.ucla.edu/data/files/Tewari/Analysis of Search and Replication in Unstructured Peer-to-Peer.pdf [retrieved on Jul. 26, 2012] the whole document.

Eric Day, Oct. 13, 2009, Eventually Consistent Relational Database?, Planet MySQL—Archives; http://planet.mysql.com/entry/?id=21685.

Avinash Lakshman, Prashant Malik, Cassandra: a decentralized structured storage system, ACM SIGOPS Operating Systems Review, vol. 44, Issue 2, Apr. 2010.

Giuseppe DeCandia, et al., "Dynamo: Amazon's Highly Available Key-value Store", Amazon.com, SOSP 2007, pp. 205-220, Oct. 14-17, 2007, Stevenson, Washington, USA, ACM 978-1-59593-591-5/07/0010.

Japanese Office Action mailed Mar. 23, 2016 (received from JP associate May 30, 2016) in corresponding JP Application 2014-517025, with English translation.

* cited by examiner

METHOD AND APPARATUS FOR DISTRIBUTED CONFIGURATION MANAGEMENT

FIELD OF THE INVENTION

The present invention relates to computer data structures and to methods and apparatus for replicating data structures over a network of peer nodes.

BACKGROUND

According to the CAP theorem, also known as Brewer's theorem, a distributed computer system may satisfy any two of the following guarantees at the same time, but not all three:

consistency (all nodes see the same data at the same time);
availability (node failures do not prevent the surviving nodes from continuing to operate);
partition tolerance (nodes on both sides of a partition will continue to operate despite message loss at the partition).

In a peer-to-peer database replication topology, peers have the same table schema and each table row has a replica on each peer. Data manipulation can occur on any peer and will then be replicated to all other peers. However, conflicts may occur if replicas of the same row are manipulated on different peers at the same time. Resolving such conflicts may be difficult, time consuming and/or involve significant overhead.

Traditional databases use locking protocols or master-slave relationships to keep data synchronized between multiple systems (e.g., on a network of nodes). However, distributed locking protocols require considerable overhead, e.g., a node must send a request for the lock, wait until the lock becomes available, make the modification, release the lock, and distribute the update. Master/slave relationships require complete connectivity between nodes and also generate substantial network traffic.

SUMMARY OF THE INVENTION

According to one or more embodiments of the invention, a method of replicating data structures over a network is provided in which each data structure is assigned an owner node among a plurality of networked peer nodes. Preferably that owner can be ascertained through information in the data structure. When an update to the data structure is desired by a non-owner, a request to modify the data structure is sent out on the network and when received by the owner, the owner performs the modification. The owner node can then notify the other nodes regarding the update.

In contrast to prior art methods that require two round-trip communications, i.e., one to change ownership and another to modify the data, there is only one, and thus this is a far more efficient protocol. Further, where the data structure represents anode resource, the node that modifies the data structure will also modify the resource. Still further, preferably the request (from a non-owner node) to modify the data structure, and the response (from the owner node), are also both data structures that can be replicated on the network in the same manner as the modified data structure.

According to one embodiment of the invention, a method of replicating data structures on a network of peer nodes is provided, wherein data structures are replicated to all nodes on the network, the method including steps of:

designating a single peer node as owner of a data structure;
permitting only the designated owner node to modify the data structure; and
when one peer node desires to modify the data structure and determines it is not the owner node, the one peer node initiates a request to modify the data structure, the request comprises one of the data structures and is owned by the one peer node, and the request is transmitted to all nodes on the network;
the owner node receives and executes the request to modify the data structure.

The invention may be distinguished from distributed management systems achieved via a centralized server, wherein the centralized server provides a single point of failure, there is no inherent (built-in) data redundancy, and connectivity is required between the management server and all other managed nodes. In contrast, in the present invention every peer node provides access to the entire group of nodes, there is data redundancy, and direct connectivity between all nodes is not required. For example, a user can connect to any participating node and manage the entire group. All data in the network is replicated to all participating nodes. The participating nodes require only partial connectivity to the entire group. The data structures will eventually be consistent across all participating nodes through the described mechanisms. By following a strict single-writer, multiple-reader protocol, update collisions are impossible and transactional consistency is ensured.

Consistency, as defined by the CAP theorem, requires all nodes to be consistent with each other at all times. Here, each data structure has an exclusive owner node and each owner node maintains consistency with respect to the data structures it owns. All peer nodes achieve eventual consistency with respect to unowned data structures through the replication process. Availability (per the CAP theorem) is achieved because each node maintains consistency on its set of replica data structures, and can therefore operate in isolation. Partition tolerance (per the CAP theorem) is achieved because exclusive data structure ownership and node local consistency allows each node to run in isolation or in the presence of a group partition. Data ownership also ensures that data collision will not occur when the partitions merge.

In one example, a relational database is replicated on each peer node. The database includes a table in which one column (field) contains an identifier of the owner of the table row. Only the owner of the row is allowed to modify the row. When an instance of the row is changed, e.g., created, modified or deleted, the database command that is generated to make the change is stored in a transaction log. When an application deems all updates are transactionally complete, the changes are sent to all peer nodes throughout the network.

In one example, data structures are replicated by propagation to all nodes on the network. When an update (change) arrives at a receiving node, the node checks to see if it already has the update. If it does, the update is dropped. If it does not, the update is processed and sent to all directly connected nodes. This ensures that if nodes A and B are connected, and nodes B and C are connected, then an update from node A will reach node C. This update mechanism is operable in networks where all nodes are not directly connected to one another.

In one example, the method allows for rolling updates among peers, including schema updates. For example, when a peer node is at a lesser schema revision than an update that arrives at the node, it will queue the updates until such time that the node is updated to match that schema revision, at which point it will apply all pending, schema-matching updates. When a peer node is at a lesser schema revision than an update that arrives, it ignores that revision. Peer nodes may be requested to send any missing updates to anode which does not yet have them. In this way, data stored within the database is eventually consistent across all peer nodes, even across software updates.

According to one embodiment of the invention, a computer-readable medium is provided containing executable program instructions for a method of replicating data structures, the method comprising:

on a network of peer nodes, wherein data structures are replicated to all nodes on the network;

designating a single peer node as owner of a data structure;

permitting only the designated owner node to modify the data structure; and     when one peer node desires to modify the data structure and determines it is not the owner node, the one peer node initiates a request to modify the data structure, the request comprises one of the data structures and is owned by the one peer node, and the request is transmitted to all nodes on the network; and     the owner node receives and executes the request to modify the data structure.

In one embodiment, the method includes:

the owner node initiates a response regarding the modified data structure, the response is one of the data structures and is owned by the owner node, and the response is replicated on the network.

In one embodiment the method includes:

when the response is received by a non-owner node, the receiving node determines whether it has already received the response and if so, drops the response, and if not, it processes the response.

In one embodiment the response includes an identifier for the modified data structure.

In one embodiment the request includes a tag uniquely identifying the request.

In one embodiment the method includes:

when one peer node desires to modify the data structure and determines it is the owner node, the one peer node modifies the data structure.

In one embodiment when a partition divides the network into multiple network partitions, the replication on each network partition remains operable.

In one embodiment when the partition ends, the replication across the partition resumes In one embodiment the network is a network in which all nodes are not directly connected.

In one embodiment the data structure includes an identifier of the owner node.

In one embodiment the data structure contains an identifier which is globally unique across all of the nodes.

In one embodiment the data structure is stored in a database.

In one embodiment the method implements a relational database.

In one embodiment the data structure is a row in a database table.

In one embodiment the data structure describes a network interface, a file system, or a file system snapshot.

In one embodiment the data structure, request and response are replicated by propagation to all nodes on the network.

According to another embodiment of the invention, a method implemented by a computer network is provided, the method comprising:

obtaining information in a replica of a data structure that is replicated on multiple peer nodes, the information indicating one of the peer nodes as an owner node that has exclusive rights to update the data structure;

determining if a peer node is the owner node via the information;

if the peer node is not the owner node, performing actions comprising:

sending a request to update the data structure to all directly connected peer nodes to propagate the request;

the owner node receiving the request, updating the data structure after receiving the request and sending an update regarding the updated data structure to all directly connected peer nodes to propagate the update.

According to another embodiment of the invention, in a computing environment, an apparatus is provided on each of a plurality of peer nodes in a network comprising:

a replication manager operable to participate in replicating a data structure across the peer nodes;

an update manager operable to update the replica of the data structure on the peer node; and     a configuration manager operable to: determine whether a peer node is an owner node of the data structure based on information included in the data structure; initiate a request to modify the data structure if the peer node is not the owner node; and process a response to the request regarding the modified data structure, wherein the owner node has exclusive rights to update the data structure and the request and response are also data structures replicated across the peer nodes.

BRIEF DESCRIPTION OF THE DRAWINGS

The invention can be more fully understood by reference to the detailed description of various embodiments, in conjunction with the following figures, wherein.

DETAILED DESCRIPTION

Figure 1:
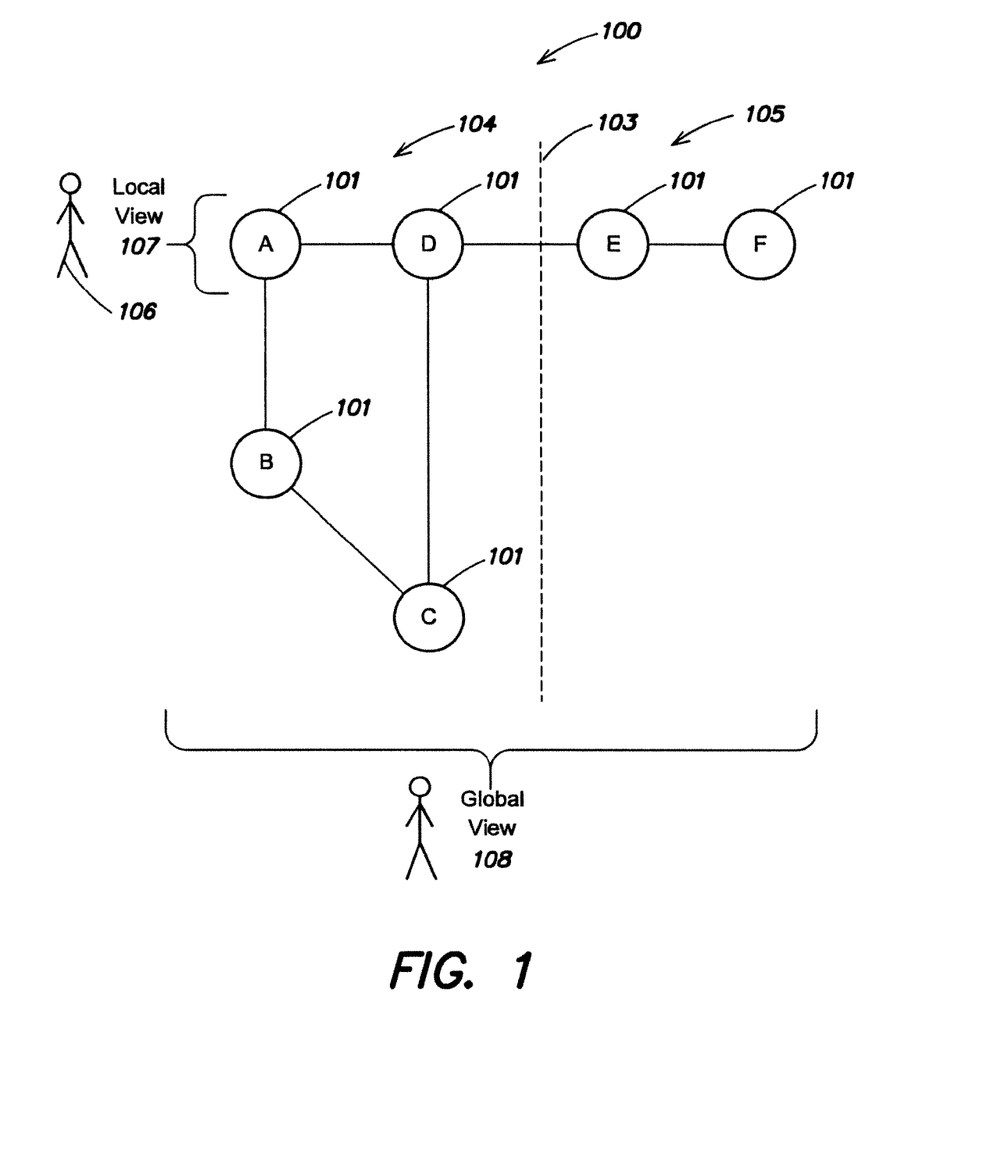
FIG. 1 is a schematic block diagram of a plurality of networked peer nodes for practicing one embodiment of the invention.

FIG. 1 is a schematic diagram of a plurality of peer nodes 101 (labeled A, B, C, D, E, F) in a network 100 for illustrating one embodiment of the invention. Each peer node has a globally unique identifier (GUID) so that each peer node can identify which node it is communicating with via messages transmitted on the network. The peer nodes are arranged in a configuration in which only some of the nodes are directly connected to other nodes. Node A is directly connected to nodes B and D; node D is directly connected nodes A, C and E; node B is directly connected to nodes A and C; node C is directly connected to nodes B and D; node E is directly connected to nodes D and F; and node F is directly connected to node E. In this example the network may be partitioned (at some point in time) as indicated by the dashed line 103, wherein nodes A-D are located on one network partition 104 (left hand side of the partition) and nodes E-F on another network partition 105 (right hand side of the partition). Also illustrated in FIG. 1 is a user 106, such as an administrator, who may view one peer node (e.g., node A) of the network, thus having a local view 107, or alternatively may view the entire plurality of nodes and have a global view 108.

In various embodiments, the network may comprise one or more local area networks, wide area networks, direct connections, virtual connections, private networks, virtual private networks, the internet, some combination of the above, and the like.

Figure 6:
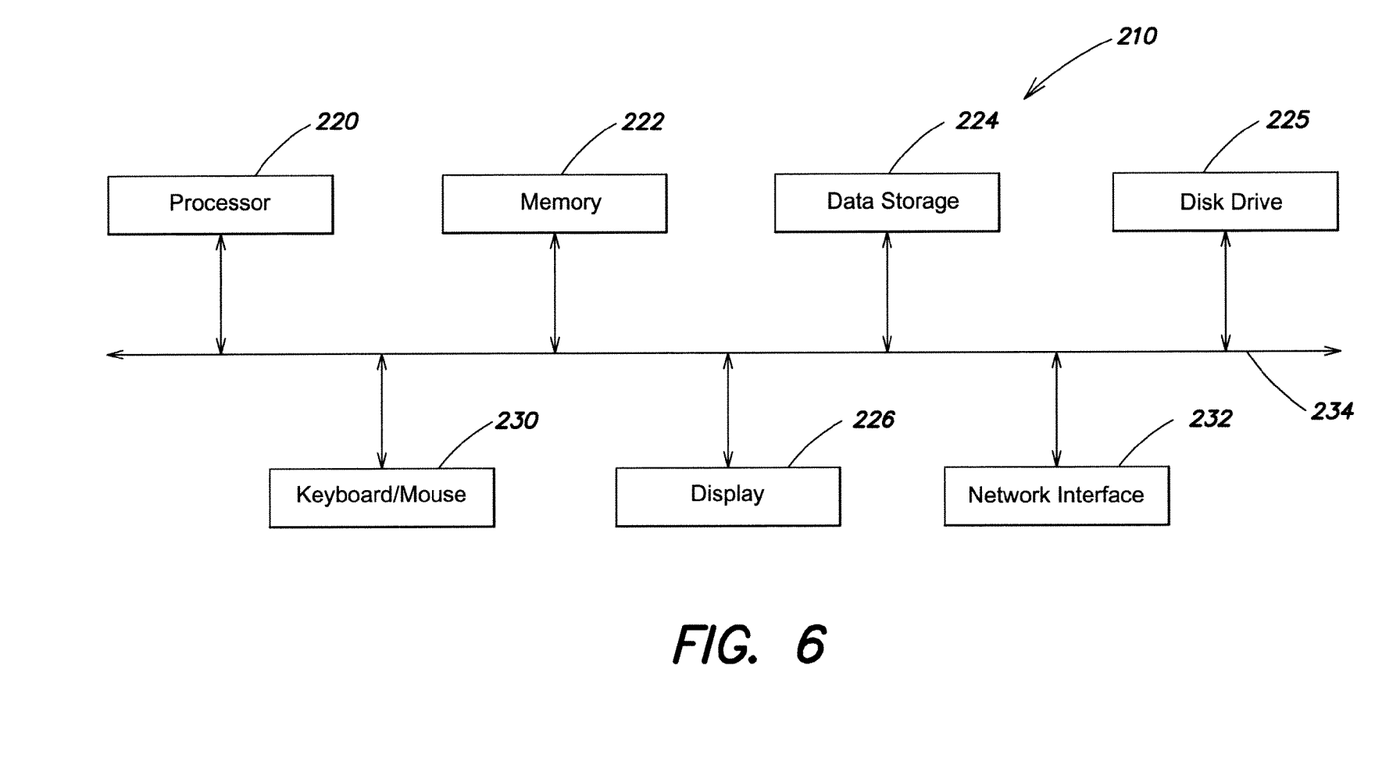
FIG. 6 is a block diagram of a computing system environment in which various embodiments of the invention may be implemented.

Each of the peer nodes may be implemented on or as one or more computers, such as the computer described in conjunction with FIG. 6. A peer node 101 may include one or more processes that request access, either directly or indirectly, to data stored in a database. A peer node may include one or more processes that request access, either directly or indirectly, to data stored on a data store. A peer node may include a file system or the like for organizing and representing access to data.

In one example, a database comprises a repository that is capable of storing data in a structured format. The term data is understood broadly to include anything that may be stored on a computer storage medium. Some examples of data include information, program code, program state, program data, other data, and the like.

Data stored in the database may be organized in tables, records, objects, or other data structures, and the like. The database may comprise a relational database, object-oriented database, hierarchical database, network database, or other type of database, some combination or extension of the above, and the like.

The database may be accessed via a database management system (DBMS), comprising one or more programs that control the organization, storage, management and retrieval of data in a database. The DBMS may receive requests to access data in the database and may perform the operations needed to provide this access. Access may include reading data, writing data, deleting data, updating data, a combination including one or more of the above, and the like. The database may be stored on a data store, comprising any storage media capable of storing data. The data store upon which the database is stored may be external, internal, or include components that are both internal, external to the peer nodes.

Returning to FIG. 1, in one example of the present invention a user 106 located at node A initiates a command for a snapshot (snap) of file system one (FS-1) located on node C. Node A determines that it is not the owner of FS-1 and thus initiates a request for a snapshot of FS-1 which it sends to all directly connected nodes, i.e., nodes D and B on the network 100. The receiving nodes D and B further propagate the request to all directly connected nodes, whereby two copies of the request will be received at node C from both of nodes B and D. Similarly, nodes E and F (assuming no partition) will receive the request via node D.

When node C receives the first request, node C determines that it is the owner node regarding FS-1. Therefore it executes the request, generating a snapshot of FS-1. Node C then initiates a response regarding the file system snapshot which it sends to all directly connected nodes, i.e., nodes B and D, which further propagate the response by sending the response to all directly connected nodes. In this manner, the originator of the request, node A, receives the response. Node A can now provide the snapshot FS-1 to the user 106. When node C receives the second request, it simply ignores it. In a similar manner, when node A receives responses from both nodes B and D, it simply ignores the second response.

In an alternative embodiment, the user 106 that previously requested the snapshot of FS-1 on node A, can move to node B and here await the response and the snapshot FS-1. Alternatively, the administrator 106 could have initiated the request from node B, rather than node A. Thus, the administrator can connect to any one of the participating nodes and effectively manage the entire group of nodes.

In an alternative example, rather than a file system snapshot, one of the nodes may initiate a request for a file system integrity check. The owner node will then send a response, or periodic responses, regarding to the requested integrity check.

The embodiments described can be used to synchronize relational databases across multiple nodes. In a relational database, a row in a table is a data structure. By limiting updates to any given row to a single owner node, the need for distributed locks has been eliminated. Only the node owning the data structure is allowed to change it, and all other peer nodes must request that the owner node change the data structure for them. Thus, ownership of the data structure is exclusive.

By limiting the ability to modify a data structure to one owner, and requiring non-owners to request modifications be made by the owner, collisions are impossible during replication and transactional consistency can be maintained. Preferably, each peer node maintains records of each modification of the data structure and each peer node applies the transactional changes not in the order they are received, but in the order that they are created. When a peer node is unable to apply changes because an update is missing from the stream of transactional changes, the node is responsible for asking its peer nodes for the missing transactions. In one embodiment, a transaction may consist of:

1. a monotonically increasing transaction number that is also owned by the originating node (that requests the change);
2. the schema revision that the changes were applied to; and
3. a record of all changes made to the data structure.

Still further, if a network becomes partitioned e.g., due to a node going offline or a link between nodes going down, the multiple network partitions on opposite sides of the partition continue to operate, even though data loss occurs at the partition. Each node continues to receive requests and responses and data structure updates from nodes on its side of the partition. Then, when the partition is removed (e.g., the node comes back online or the link resumes operation) and the former network partitions become joined, both sides will now receive the new responses, requests and updates, and because each node keeps track of updates (e.g., by the time of origination) it can determine which updates it is missing, ask the other nodes to send the missing updates, and then apply all updates in the proper order so that nodes on both sides of the (former) partition come back into sync.

The requests and responses generated are preferably data structures themselves, replicated on the peer nodes, e.g., by propagation to all directly connected nodes for eventual receipt by all nodes. Thus, not only is the modified data structure (generated by the owner node) replicated on the network, but the request and response are also data structures that can be similarly replicated. This simplifies implementation of the requests and responses by utilizing the existing process of replication. In addition, by designating the originator of the request, as the owner of the request data structure, and designating the originator of the response, as the owner of the response data structure, no other (non-owner) node can modify the request or response.

Figure 2:
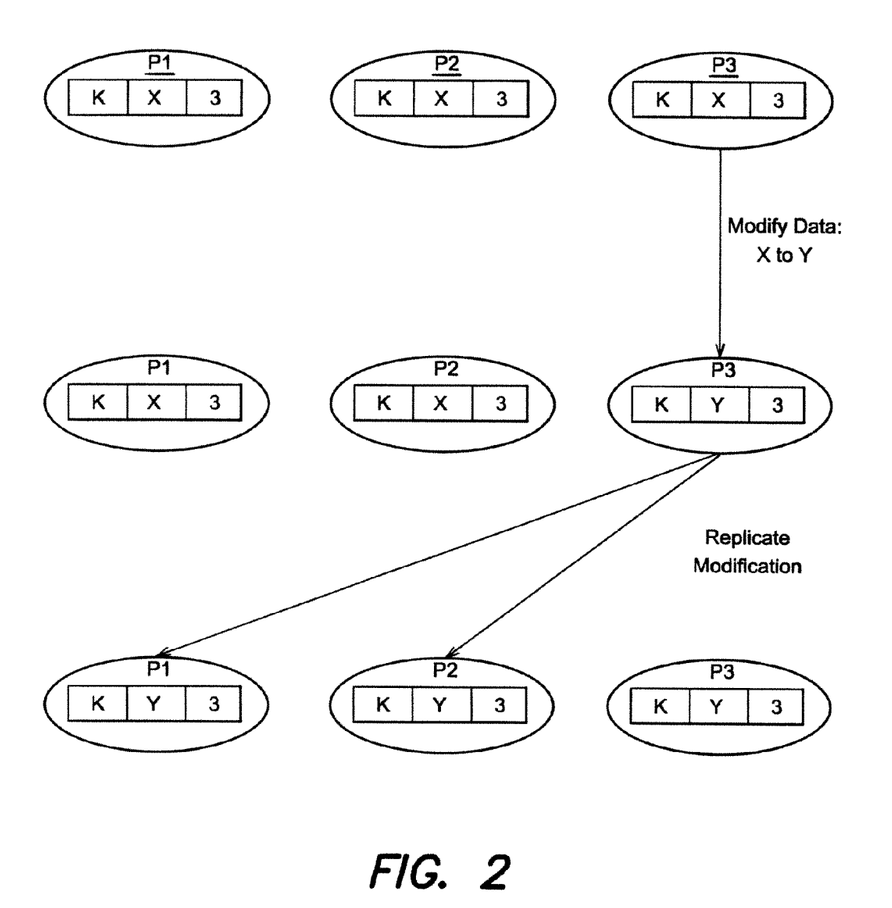
FIG. 2 is a block diagram of exemplary actions involving replicas of a data structure in accordance with one embodiment of the invention.

FIG. 2 illustrates one example of a method of modifying a data structure. Here three peer nodes labeled P1, P2, and P3, each maintain a replica of a data structure. In this example, the data structure has three fields, a first field with an index key k, a second field with a value x, and a third field with an identifier of the owner of the data structure. Here the node 3 (P3) is designated the owner node and thus is the only node that can modify the data structure. As shown in FIG. 2, upon receiving a request from another node, or upon its own initiative, node P3 modifies the second data field to change x to y. The owner node P3 then replicates this modification to the other nodes P1 and P2. Following the replication, all 3 nodes contain the same data in each field.

Figure 3:
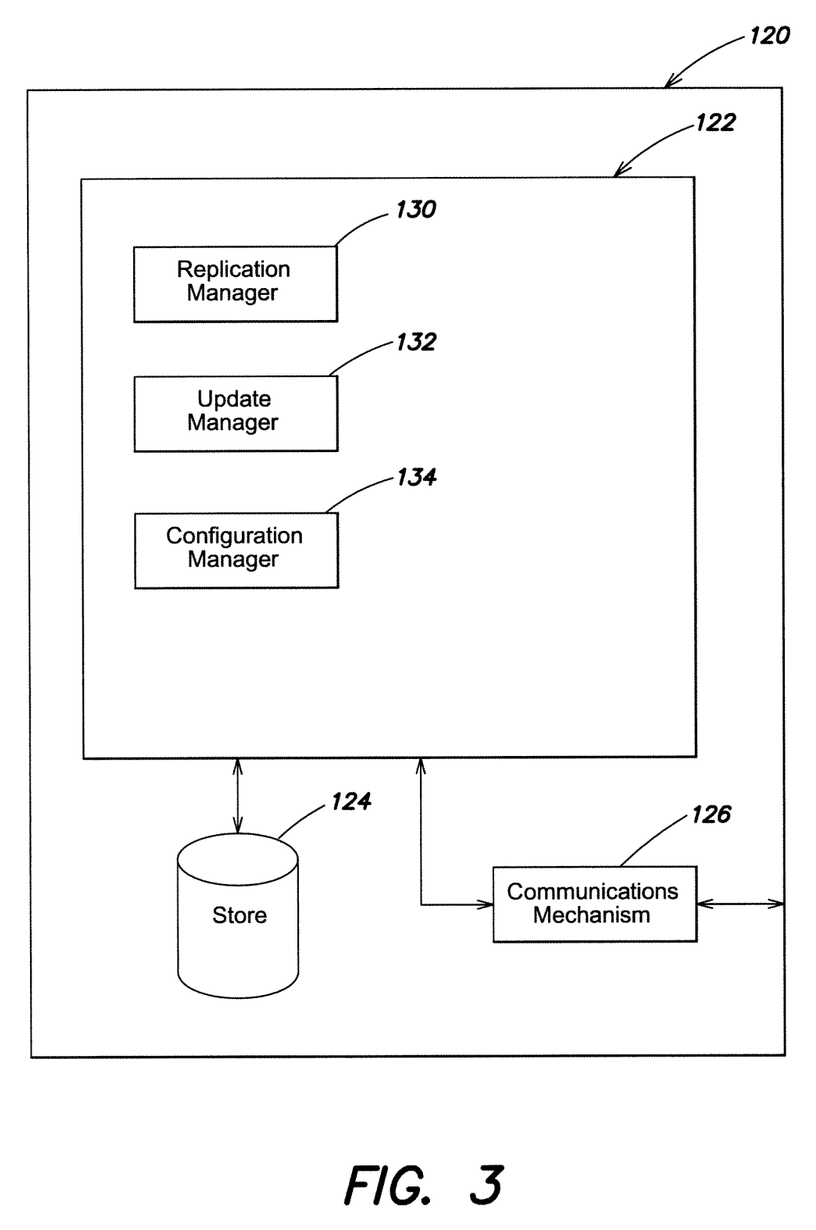
FIG. 3 is a block diagram of an apparatus configured as a peer node in accordance with one embodiment of the invention.

FIG. 3 illustrates one embodiment of an apparatus 120 for implementing a peer node. The apparatus includes various program modules 122, a data store 124, and a communications mechanism 126. The program modules may include a replication manager 130, an update manager 132, and a configuration manager 134. The communications mechanism 126 allows the apparatus to communicate with the other nodes on the network. The communications mechanism may be a network interface or adapter, modem, or any other mechanism for establishing communications with the other nodes.

The data store 124 is any storage media capable of storing data. The store may comprise a file system or database. The store may be external, internal or include components that are both internal and external to the apparatus 120.

The replication manager 130 is operable to participate in replicating data structures across the peer nodes. This can be done by transmitting the data structure, changes to the data structure, actions involved in changing the data structure, or a variety of other ways as understood by those skilled in the art. For example, after the update manager 132 updates the data structure, the modification (update) to the replica may be replicated to the other peer nodes via the replication manager 130.

The configuration manager 134 implements the requests and responses to modify a data structure, as previously described.

Figure 4:
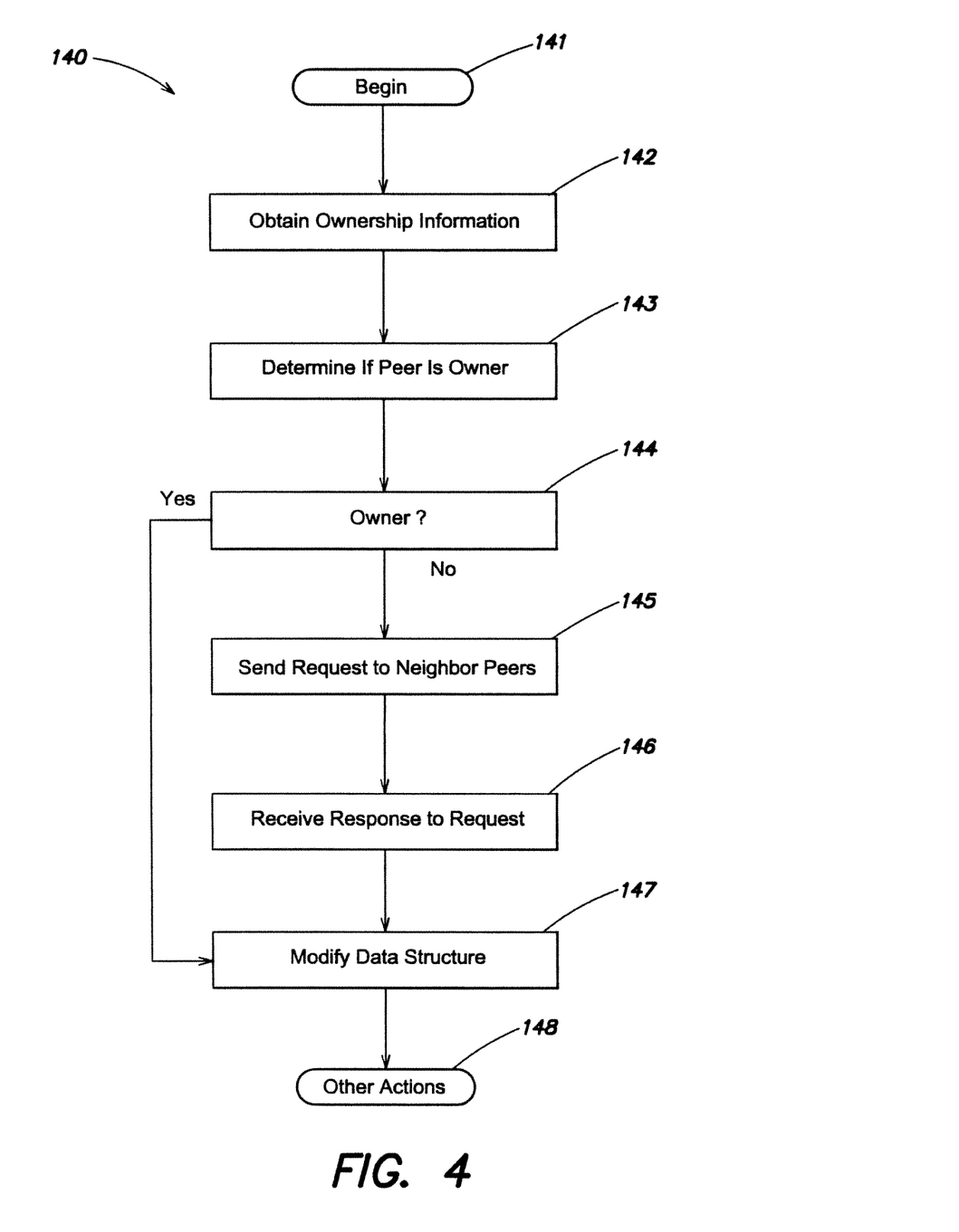
FIG. 4 is a flow diagram of actions that may occur on a peer node seeking to modify a data structure in accordance with one embodiment of the invention.
Figure 5:
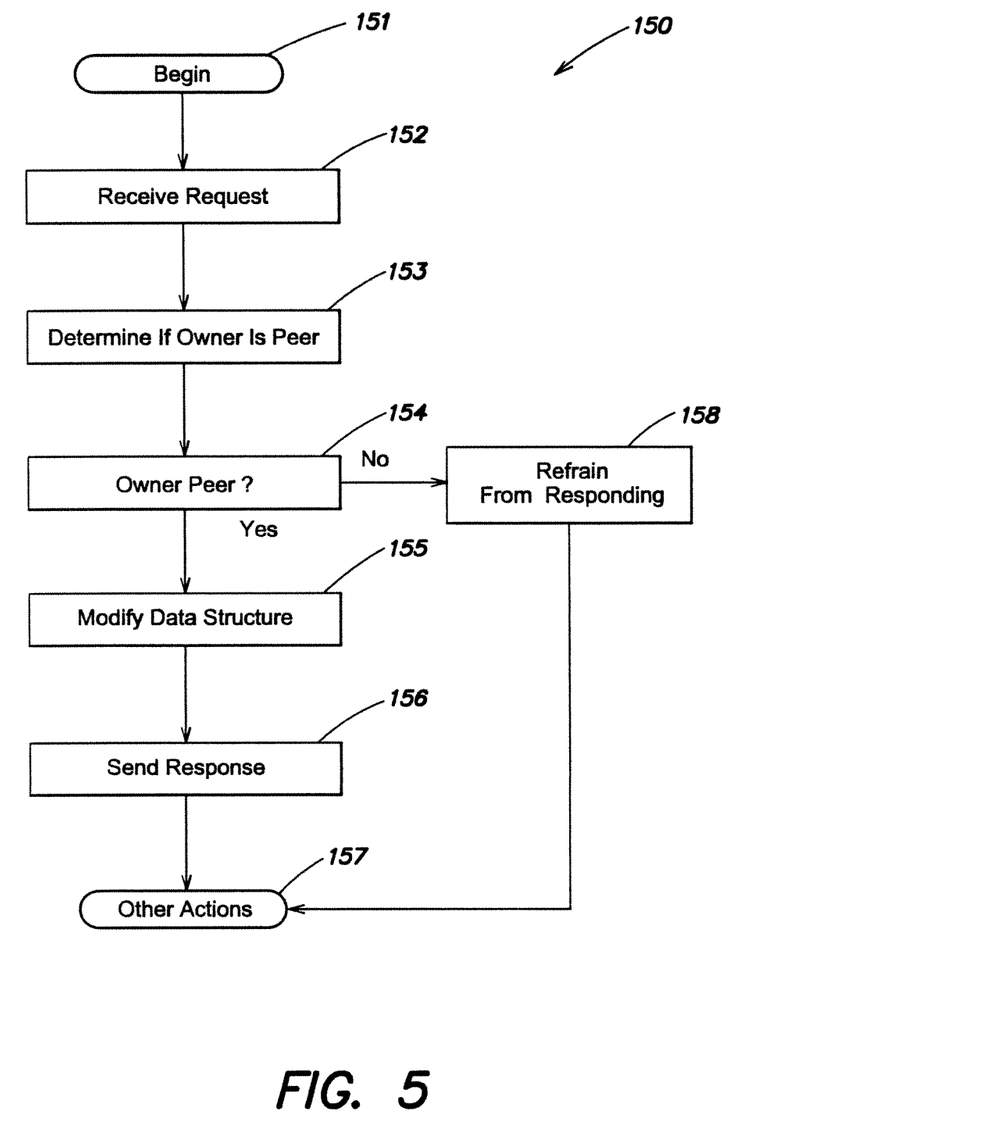
FIG. 5 is a flow diagram of actions that may occur on a peer node receiving a request to modify a data structure according to one embodiment of the invention.

FIGS. 4-5 are flow diagrams that generally represent actions that may occur in accordance with various embodiments of the invention. It is to be understood that the flow charts are not limiting and the actions illustrated may be performed in another order, with additional actions present or one or more actions deleted.

FIG. 4 is a flow diagram 140 generally representing actions that may occur on a peer node that desires to modify a data structure. At a first block 141, the actions begin. At a next block 142, ownership information of the data structure is obtained, e.g., from within the data structure itself. At a next block 143, the peer node determines whether it is the owner of the data structure, for example, utilizing the configuration manager 134 of FIG. 3. The peer node may determine that it is the owner of the data structure (block 144). If not, then at the next block 145 the peer node initiates a request that is sent to all of its neighboring (directly connected) peer nodes, e.g., via the communication mechanism 126 of FIG. 3. At a next block 146, a response to the request is received from the owner node. The peer node then processes the response and modifies the data structure accordingly (next block 147); this may be performed by the update manager 132 of FIG. 3. At a next block 148, other actions, if any, are performed.

Alternatively, if the node originating the desired change determines that it is the owner node of the data structure (at block 144), then it proceeds immediately to modify the data structure (block 147). Here there is no need to send a request. In this case, the owner node will subsequently generate a message regarding the modified data structure which is sent (block 148) to all directly connected nodes and propagated on the network for replicating the modified data structure on all peer nodes.

FIG. 5 is a flow diagram 150 generally representing actions that may occur on a peer node that receives a request to modify a data structure. At a first block 151, the actions begin. At a next block 152, the peer node receives a request to modify a data structure. At a next block 154, the peer determines whether it is the owner node of the data structure, for example utilizing the configuration manager 134 of FIG. 3. If the node determines it is the owner of the data structure, in a next block 155 the node modifies the data structure, for example utilizing the update manager 132 of FIG. 3. The owner node then sends a response regarding the modified data structure to all other nodes on the network by sending the response directly to all directly connected nodes which is then propagated to the other nodes (block 156). At block 157, other actions, if any, are performed.

Alternatively, at block 154, if the peer determines it is not the owner peer, it refrains from responding to the request (block 158). Instead, it proceeds immediately to any other actions (block 157), e.g., forwarding the request to all directly connected nodes to propagate the request to the other nodes.

FIG. 6 illustrates an example of a computing system (computer) at each node on which various aspects of the subject matter of the present invention may be implemented. This is only one example of a computing system, and it is not meant to be limiting. Generally, the subject matter described herein may be implemented as a general purpose or a special purpose computing system, including server computers, multi-processor systems, network PC's, mainframe computing systems, and systems that include any of the above systems or devices, and the like.

The subject matter of the present invention may be implemented as computer-executable instructions, such as program modules, being executed by a computer. Such program modules may include routines, programs, objects, components, data structures, and so forth, which perform particular tasks or implement particular abstract data types. The tasks may be performed by remote processing devices that are linked through a communications network.

In the example of FIG. 6, a computing apparatus 210 includes a processor 220, memory 222, data storage 224, disk drive 225, keyboard/mouse 230, display 226, and network interface 232. Components are coupled together via a system bus 234. The software product(s) of the invention may be loaded into data storage 224 and during operation are transferred into (e.g., RAM) memory 222 and executed by processor 220.

The computer 210 operates in a networked environment. For example, network interface(s) 232 may couple the system bus 234 to a local area network (LAN), which provides access to remote computers, which may have internal or external storage. When used in a wide area network (WAN) environment, the computer 210 may communicate via a modem over the WAN, such as the Internet, with remote computers and storage.

As used herein, computer-readable media can be any media that can be accessed by a computer and includes both volatile and non-volatile media, removable and non-removable media.

As used herein, computer storage media includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

A communication media linking the peer nodes on the network may include wired media and wireless media such as acoustic, RF, infrared or other wireless media. The communication media may transfer a modulated data signal, such as a carrier wave encoded with information or any other transport mechanism. The term modulated data signal means a signal that has one or more characteristic changes so as to encode information in the signal. In a further embodiment, nodes can be connected temporarily, e.g. allowing transfer of data structure updates by a USB key.

As used herein, the term "includes" and its variants are to be read as open-ended terms that mean "includes, but is not limited to." The term "or" is to be read as "and/or" unless the context clearly dictates otherwise.

It is to be understood that the foregoing description is intended to illustrate and not limit the scope of the invention.

The invention claimed is:

1. A computer-implemented method comprising:
utilizing a single replication method for replicating, on a network of peer nodes, each of the following data structures:
an updated data structure;
a request data structure;
a response data structure;
wherein the single replication method is implemented by a replication manager at each peer node operable to achieve eventual consistency among the data structures maintained across the peer nodes, including among peer nodes that are not directly connected on the network, and wherein the method is operable both during a partition that divides the network into multiple network partitions, and after the partition ends, without a change of ownership of the data structures;
wherein the single replication method comprises:
designating, for each data structure, a single exclusive peer node as an owner node of the data structure, wherein only the designated owner node is permitted to update the data structure;
when any one of the peer nodes desires to update one of the data structures, a one peer node desiring to update the one data structure determines whether it is the owner node of the one data structure and:
if the one peer node determines it is the owner node of the one data structure, the one peer node updates the one data structure and requests that the updated data structure be replicated by propagation to all of the other peer nodes on the network by the replication managers;
if the one peer node determines it is not the owner node of the one data structure, the one peer node generates a request data structure, the request data structure being owned by the one peer node and being similarly replicated by propagation to all of the other peer nodes on the network by the replication managers, wherein the request data structure comprises a request to update the one data structure;
the owner node, upon receiving the request, executes the request by updating the one data structure and generating a response data structure, the response data structure being owned by the owner node and being similarly replicated by propagation to all of the other peer nodes on the network by the replication managers, wherein the response data structure includes the updated one data structure.

2. The computer-implemented method of claim 1, wherein the single replication method includes:
when the response data structure is received by a non-owner node, the receiving node determines whether it has already received the response data structure and if so, drops the response data structure, and if not, it processes the response data structure.

3. The computer-implemented method of claim 2, wherein the response data structure includes an identifier for the updated one data structure.

4. The computer-implemented method of claim 1, wherein the request data structure includes a tag uniquely identifying the one data structure.

5. The computer-implemented method of claim 1, wherein the network is a network in which not all peer nodes are directly connected.

6. The computer-implemented method of claim 1, wherein the one data structure includes an identifier of the owner node.

7. The computer-implemented method of claim 1, wherein the one data structure contains an identifier which is globally unique across all of the peer nodes.

8. The computer-implemented method of claim 1, wherein the one data structure is stored in a database.

9. The computer-implemented method of claim 1, wherein the single replication method implements a relational database.

10. The computer-implemented method of claim 1, wherein the one data structure is a row in a database table.

11. The computer-implemented method of claim 1, wherein the one data structure describes a network interface, a file system, or a file system snapshot.

12. In a computing environment, an apparatus on each of a plurality of peer nodes in a network comprising:
a replication manager operable to participate in replicating a data structure across the peer nodes;
an update manager operable to update a data structure on a peer node; and
a configuration manager operable to determine whether a peer node is an owner node of a data structure,
wherein the replication manager, update manager and configuration manager include program instructions stored on memory and operable to be executed on a processor to perform a method comprising:
utilizing a single replication method among the peer nodes for replicating each of the following data structures:
an updated data structure;

a request data structure;
a response data structure;
wherein the single replication method is implemented by a replication manager at each peer node operable to achieve eventual consistency among the data structures maintained across the peer nodes, including among peer nodes that are not directly connected on the network, and wherein the method is operable both during a partition that divides the network into multiple network partitions, and after the partition ends, without a change of ownership of the data structures;

wherein the single replication method comprises:
    designating, for each data structure, a single exclusive peer node as an owner node of the data structure, wherein only the designated owner node is permitted to update the data structure;
    when any one of the peer nodes desires to update one of the data structures, a one peer node desiring to update the one data structure determines whether it is the owner node of the one data structure and:
    if the one peer node determines it is the owner node of the one data structure, the one peer node updates the one data structure and requests that the updated data structure be replicated by propagation to all of the other peer nodes on the network by the replication managers;
    if the one peer node determines it is not the owner node of the one data structure, the one peer node generates a request data structure, the request data structure being owned by the one peer node and being similarly replicated by propagation to all of the other peer nodes on the network by the replication managers, wherein the request data structure comprises a request to update the one data structure;
    the owner node, upon receiving the request, executes the request by updating the one data structure and generating a response data structure, the response data structure being owned by the owner node and being similarly replicated by propagation to all of the other peer nodes on the network by the replication managers, wherein the response data structure includes the updated one data structure.

13. The apparatus of claim 12, wherein the configuration manager is operable to:
    when the response data structure is received by a non-owner node, the receiving node determines whether it has already received the response data structure and if so, drops the response data structure, and if not, it processes the response data structure.

14. The apparatus of claim 12, wherein the network is a network in which not all peer nodes are directly connected.

15. The apparatus of claim 12, wherein the one data structure includes an identifier of the owner node.

16. The apparatus of claim 12, wherein the one data structure contains an identifier which is globally unique across all of the peer nodes.

17. The apparatus of claim 12, wherein the one data structure is stored in a database.

18. The apparatus of claim 12, wherein the program instructions are operable to implement a relational database.

19. The apparatus of claim 12, wherein the one data structure is a row in a database table.

20. The apparatus of claim 12, wherein the one data structure describes a network interface, a file system, or a file system snapshot.

* * * * *